United States Patent

Hare et al.

Patent Number: 5,101,617
Date of Patent: Apr. 7, 1992

[54] LAWN MOWER FLAP MOUNT

[75] Inventors: Ronald G. Hare; Kristoffer A. Hess; Ronald A. Jackson, all of Brockville, Canada

[73] Assignee: Black & Decker Inc., Newark, Del.

[21] Appl. No.: 532,039

[22] Filed: Jun. 1, 1990

[51] Int. Cl.⁵ .................. A01D 34/82; A01D 75/18
[52] U.S. Cl. .................. 56/17.4; 56/320.1; 56/DIG. 9; 56/DIG. 24
[58] Field of Search ........... 56/17.4, 320.1, DIG. 9, 56/DIG. 24, 17.5

[56] References Cited

U.S. PATENT DOCUMENTS

| Re. 31,930 | 7/1985 | Luick . |
| 2,489,059 | 11/1949 | Surgi . |
| 2,734,327 | 2/1956 | Whitney . |
| 3,039,340 | 6/1962 | Livermont . |
| 3,095,215 | 6/1963 | Black . |
| 3,226,920 | 1/1966 | Gilbertson .......... 56/17.4 X |
| 3,306,015 | 2/1967 | Myers . |
| 3,378,995 | 4/1968 | Welsh ............ 56/320.1 |
| 3,432,183 | 3/1969 | Groll ............ 56/17.4 X |
| 3,547,472 | 12/1979 | Ehrman . |
| 3,549,171 | 12/1970 | Katz . |
| 3,700,260 | 10/1972 | Moore et al. . |
| 3,726,544 | 4/1973 | Miller . |
| 3,727,386 | 4/1973 | Jespersen et al. ........ 56/17.4 X |
| 3,797,213 | 3/1974 | Sadow, Jr. et al. . |
| 3,799,580 | 3/1974 | McGuire . |
| 3,874,149 | 4/1975 | Seifert et al. . |
| 4,030,277 | 6/1977 | Christopherson . |
| 4,138,094 | 2/1979 | Thir . |
| 4,241,567 | 12/1980 | Carolan . |
| 4,326,727 | 4/1982 | Rock . |
| 4,533,173 | 8/1985 | Davis et al. . |
| 4,665,683 | 5/1987 | Paolucci . |
| 4,800,601 | 1/1989 | DeCaro . |

FOREIGN PATENT DOCUMENTS

| 1158869 | 12/1983 | Canada . |
| 1176063 | 10/1984 | Canada . |
| 2529402 | 1/1976 | Fed. Rep. of Germany ....... 56/17.4 |

Primary Examiner—Stephen J. Novosad
Attorney, Agent, or Firm—Charles E. Yocum; Dennis A. Dearing; John D. Del Ponti

[57] ABSTRACT

A method and apparatus for mounting a protective flap assembly to the deck housing of a lawn and garden device is disclosed. The deck housing includes a horizontal support member having an open end and a closed end at opposite lateral edges thereof. The properties flap assembly has an upper socket portion adapted to surroundingly capture the support member upon inward sliding insertion onto the open end thereof. A lower portion of the protective flap assembly extends downwardly toward the ground. The support member is adapted to inhibit removal of the flap assembly following installation on the deck housing.

19 Claims, 5 Drawing Sheets

LAWN MOWER FLAP MOUNT

BACKGROUND AND SUMMARY OF THE INVENTION

The present invention relates to a lawn and garden device and, in particular, to a method and apparatus for mounting a protective flap to the deck housing of a rotary lawn mower.

Conventional rotary lawn mowers have a deck housing which is adapted to support and enclose one or more rotating cutter blades. To protect the operator from being struck by objects propelled from the cutter blades, it has heretobefore been known to provide a rear protective shield extending between a lower portion of the deck housing and the ground. These protective shields are also useful in inhibiting the operator from inserting his feet under the deck housing and into contact with the rotating blades.

Unfortunately, a common problem associated with some typical protective shields is that they interfere with convenient operation of the mower, particularly in reversing or backward cuts. This interference problem is especially present in lawn mowers, and other lawn and garden devices, having pivotable handle assemblies which permit the operator to push the device in a forward and rearward direction by simply "flipping" the handle assembly relative to the deck housing. Therefore, both a front and rear shield member are required to effectively protect the operator in both directions of operation.

Conventionally, protective shields have been secured to the deck housing using separate mounting components such as brackets, fasteners and the like. As such, manufacturers of lawn and garden devices must assemble the protective shields and the various mounting components onto the deck housing which is timeconsuming and inefficient. In addition, the use of the additional mounting components adds cost to the finished product. Furthermore, the use of fasteners (i.e. nuts and bolts) tends to permit the operator to remove the shields in a relatively easy manner. Removal of the shield is undesirable since it can increase the risk of injury to the operator.

Accordingly, the present invention is a method and apparatus for mounting a protective flap or shield to the deck housing of a power-driven lawn and garden device. In particular, means are provided for permanently installing the protective flap onto the deck housing without the use of mounting brackets and fasteners so as to inhibit removal of the flap by the operator.

A further object of the present invention is to provide a relatively simple and economical mounting arrangement for mounting a flap assembly on the deck housing of a lawn mower. In particular, the present invention provides a cost-effective mounting arrangement for mounting front and rear flap assemblies on a lawn mower having a pivotable "flip-over" handle assembly. More particularly, a support member is integrally formed on the lower edges of the front and rear sides of the deck housing. The flap assembly has a complimentary mating socket configured to surroundingly capture the support member for securing the flap assembly to the deck housing. One lateral end of the support members is open to permit sliding installation of the flap assembly thereon. In particular, the flap assembly is installed on the deck housing by sliding the complimentary socket portion of the flap assembly longitudinally over the open end of the deck support member. The open end of the support members include means for permitting sliding installation in a first longitudinal direction while inhibiting removal of the flap assembly in an opposite direction. In addition, the opposite lateral end of the support members is closed to limit the longitudinal installation of the flap assembly for aligning the flap assembly relative to the deck housing while assisting in inhibiting removal of the flap assembly.

It is a further object of the present invention to provide a flap assembly having a relatively rigid upper portion forming the socket and a relatively flexible lower portion extending downwardly therefrom which acts as the protective flap. The relatively flexible lower portion is resilient such that it can flex to accommodate variations in ground contour at all cut height settings. In addition, the lower flexible portion is adapted to fold under the deck housing upon reversal of the mowing direction.

Additional objects, advantages, and features of the present invention will become apparent to one skilled in the art from a reading of the following detailed description and dependent claims, taken in conjunction with the accompanying drawings.

DETAILED DESCRIPTION OF THE PREFERRED EMBODIMENTS

Figure 1:
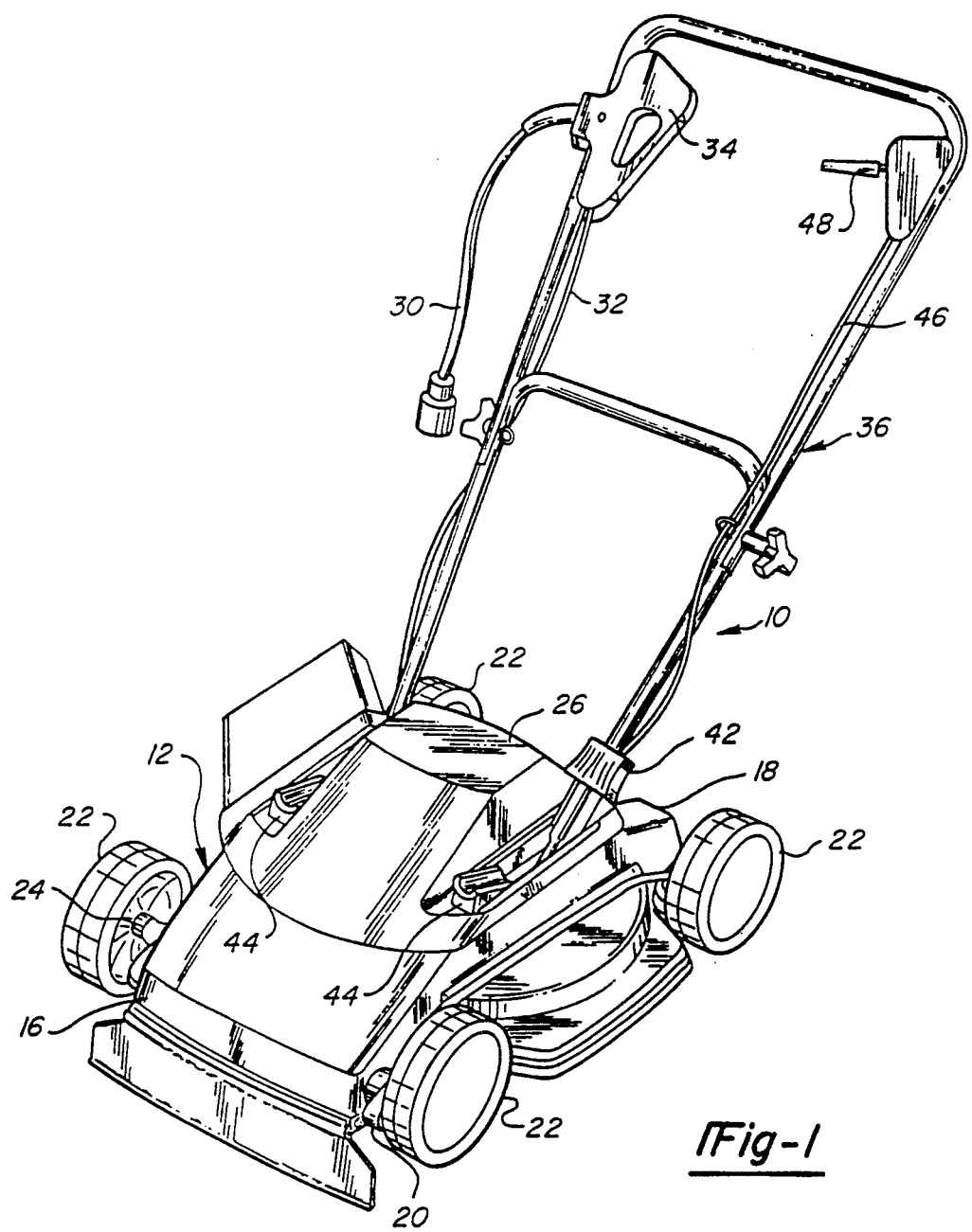
FIG. 1 is a perspective view of an exemplary lawn mower having an improved flap assembly and flap mounting structure accordi to a first embodiment of the present invention.
Figure 2:
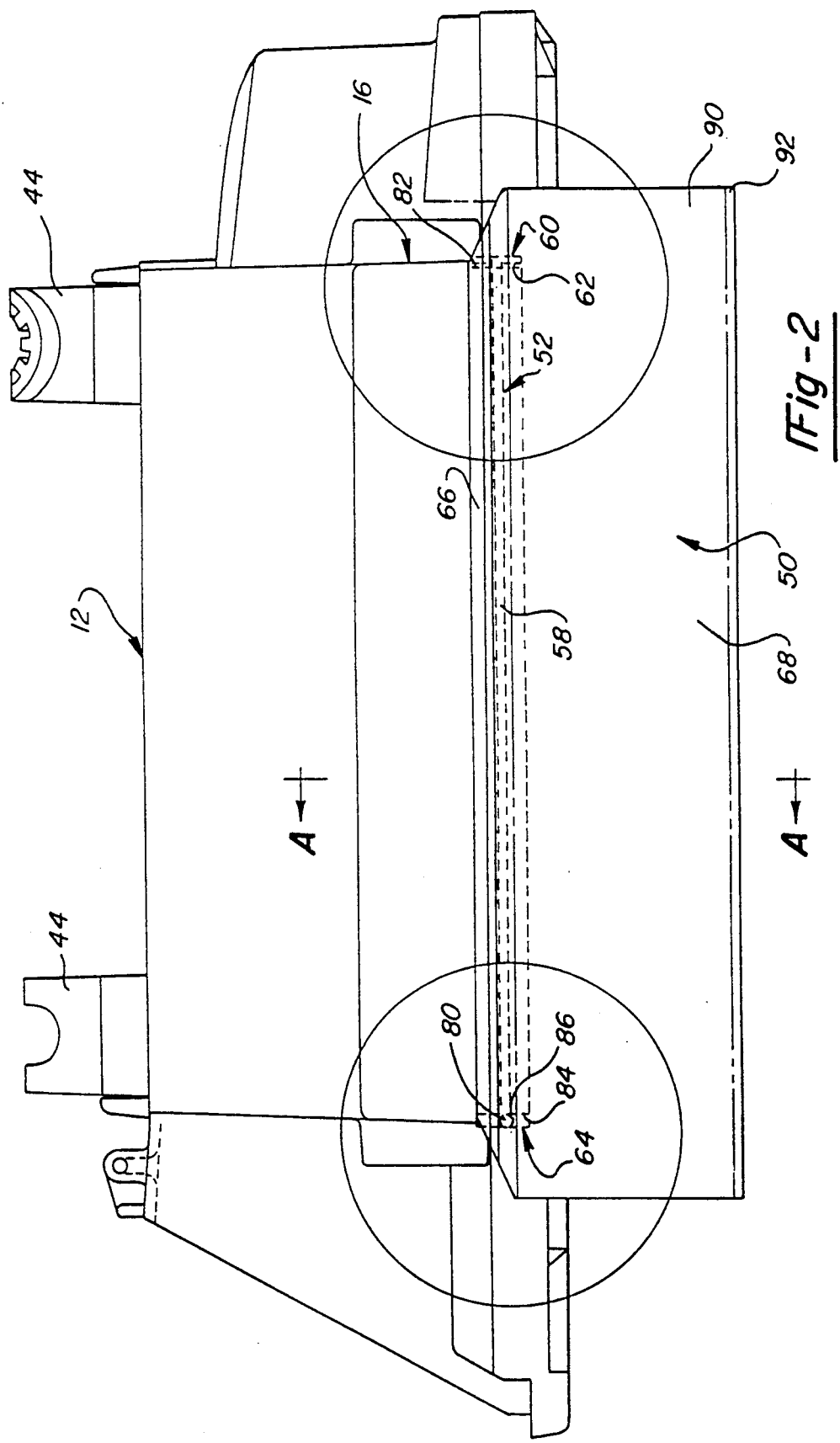
FIG. 2 is a rear view of the deck housing shown in FIG. 1 illustrating installation of a rear flap assembly.
Figure 3:
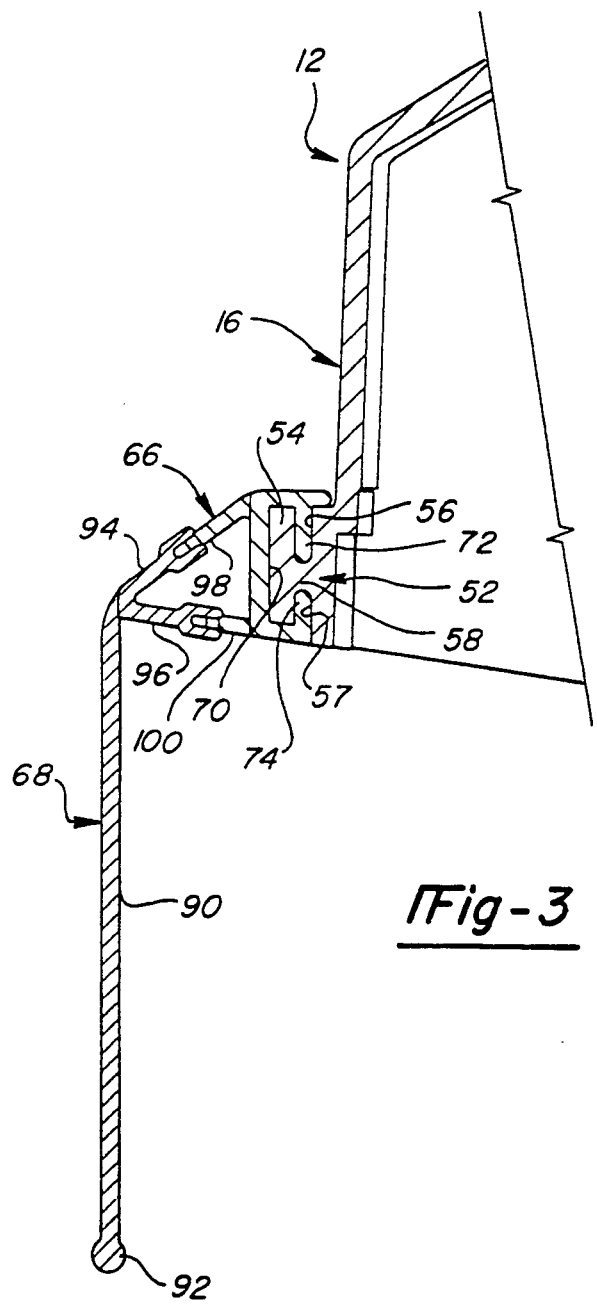

With particular reference to the drawings, an exemplary rotary lawn mower 10 embodying the novel features of the present invention is illustrated. More particularly, rotary lawn mower 10 illustrates a wheel supported, electrical lawn mower, which is one type of lawn and garden device for which the present invention is particularly useful. However, it is to be understood that the present invention is not restricted to the exemplary embodiment shown and may be employed in other type of lawn and garden devices, including both gas and electric powered as well as wheel and air supported devices.

Mower 10 includes a deck housing 12 which is preferably cast or molded of a lightweight, relatively rigid material. Deck housing 12 defines a front portion 16 and a rear portion 18 and supports four (4) wheel extensions or feet 20 thereon. A set of four (4) ground engaging wheels 22 are journaled on support shafts 24 which are either affixed to or otherwise suitably supported by feet 20. An electric motor (not shown) is supported upon and fixed to a generally centralized portion of deck housing 12 and is covered and protected by a removable insulative shroud member 26. The underside portion of deck housing 12 defines a blade cavity within which at least one rotary cutting blade (not shown) is supported and driven by the motor through a suitable power transmission device (not shown). The electric motor is powered from a remote electrical source connected thereto by a line cord 30 and a motor cable 32. A control mechanism 34 is provided which interconnects line cord 30 and motor cable 32 for selectively permitting on/off operation of mower 10. A handle assembly 36 is pivotably connected to deck housing 12 on opposite lateral sides of the electric motor. Handle assembly 36 supports line cord 30 and motor cable 32 such that when the electric motor is energized and mower 10 is moved over the ground, the cutting blades rotate to perform the desired lawn cutting operation. A discharge opening 38 is integrally formed in deck housing 12 and extends from one side thereof for discharging grass clippings from the blade cavity. Again, it is to be understood that the present invention is adapted for application to any power-driven lawn and garden device having a deck housing supported above the ground.

A handle assembly latching assembly 40 is provided for releasably latching handle assembly 36 in either a forward or rearward inclined operative position. Latching assembly 40 includes latch 42 supported on handle assembly 36 and adapted to positively engage tower supports 44 formed on deck housing 12. Tower supports 44 are oriented to define the forward and rearward positions. A cable assembly 46 connects latch 42 to a pivotally movable release lever 48 supported on the handle assembly. Movement of release lever 48 by the operator permits handle assembly 36 to be selectively positioned against tower supports 44 in either the forward or rearward positions. However, latching assembly 40 is merely exemplary in nature such that any suitable handle latching structure can be used.

In accordance with the present invention, means are provided for attaching a protective flap assembly 50 to front portion 16 and rear portion 18 of deck housing 12 in such a manner to protect the operator from being struck by objects propelled from under deck housing 12 by the rotating blades of mower 10. In particular, front and rear portions 16 and 18, respectively, of deck housing 12 include a "T"-shaped support member 52 on the lowermost outer edge portion thereof. More particularly, "T"-shaped support member 52 is an elongated, integrally formed, extension of deck housing 12 which has a vertical extending outer portion 54 and opposite, inwardly extending slots 56 and 57 which define a central horizontal stem 58. More preferably, "T"-shaped support member 52 extends along the entire length of front and rear portions 16 and 18, respectively, of deck housing 12.

A first lateral end 60 of each "T"-shaped support member 52 is closed by an abutting transverse end surface 62. The opposite lateral end 64 of "T"-shaped support member 52 is open-ended. Therefore, slots 56 and 57 are open at open end 64 to provide means for permitting longitudinal sliding insertion of flap assembly 50 thereon. More particularly, flap assembly 50 is configured to surroundingly capture "T"-shaped support member 52 so as to be permanently installed on deck housing 12. Flap assembly 50 includes an upper socket member 66 and a lower flap member 68. Upper socket member 66 forms an elongated "C"-shaped cavity 70 which is adapted to receive vertical portion 54 of "T"-shaped support member 52 therein. Flap assembly 50 is assembled onto deck housing 12 by longitudinally sliding upper socket member 66 onto open end 64 of "T"-shaped support member 52 such that upper and lower vertical legs 72 and 74, of upper socket member 66 are captured within oppositely facing, inwardly extending slots 56 and 57 respectively.

To inhibit removal of flap assembly 50 following sliding installation onto "T"-shaped support member 52, an arrow-shaped barb 80 is provided on stem 58 in close proximity to open end 64 such that upper and lower vertical legs 72 and 74 of upper socket member 66 ride over the ramped surface of barb 80. Upper socket portion 66 of flap assembly 50 is installed onto "T"-shaped support member 52 until it is stopped by engagement with transverse end surface 62. The length of upper socket member 66 is such that upon engagement of its first distal edge 82 against transverse end surface 62, its opposite distal edge 84 snaps down behind a rear tab surface 86 on arrow-shaped barb 80. In this manner, longitudinal sliding removal of flap assembly 50 through open end 64 of "T"-shaped support member 52 is inhibited.

Flap assembly 50 is, preferably, a co-extruded assembly wherein upper "C"-shaped socket member 66 is preferably fabricated from a relatively rigid material. More preferably, socket member 66 is adapted to rigidly maintain surrounding engagement with "T"-shaped support member 52 for inhibiting removal of flap assembly 50 from deck housing 12. Flap portion 68 is fabricated from a relatively flexible material to form a shield member 90 which extends downwardly toward the ground. The relatively flexible shield member 90 of flap assembly 50 terminates in a generally spherical end portion 92 which is adapted to engage the ground. Flap portion 68 is shown to include elongated arms 94 and 96 which are bonded via coextrusion processing to outwardly extending bars 98 and 100, respectively, of socket member 66. However, it is to be understood that any means for suitably securing upper socket member 66 to flap portion 68 is within the scope of the present invention.

As is apparent, deck housing 12 of the present invention is fabricated to provide integrally formed "T"-shaped support members 52 for relatively quick and permanent installation of flap assembly 50 thereon. In this manner, the operator is able to push mower 10 in either a forward or rearward direction upon "flipping38 of handle assembly 36. Flap assembly 50 is configured so as not to substantially interfere with longitudinal movement of mower 10 over the ground in either the forward or reverse direction so as to protect the operator from injury from flying objects or from inadvertent insertion of his feet under deck housing 12. More particularly, the present invention eliminates the needs for assembly of separate fasteners, brackets and the like which heretobefore permitted the undesirable removal of protective shields from the lawn mower. In addition, the present invention is more cost effective than conventional mowers having bracket mounted shields. While the exemplary embodiment illustrates use of front and rear flap assemblies 50, it is to be understood that the present invention is directed toward means for mounting an improved flap structure to any combination of front, rear or side surfaces on a deck housing.

Figure 4:
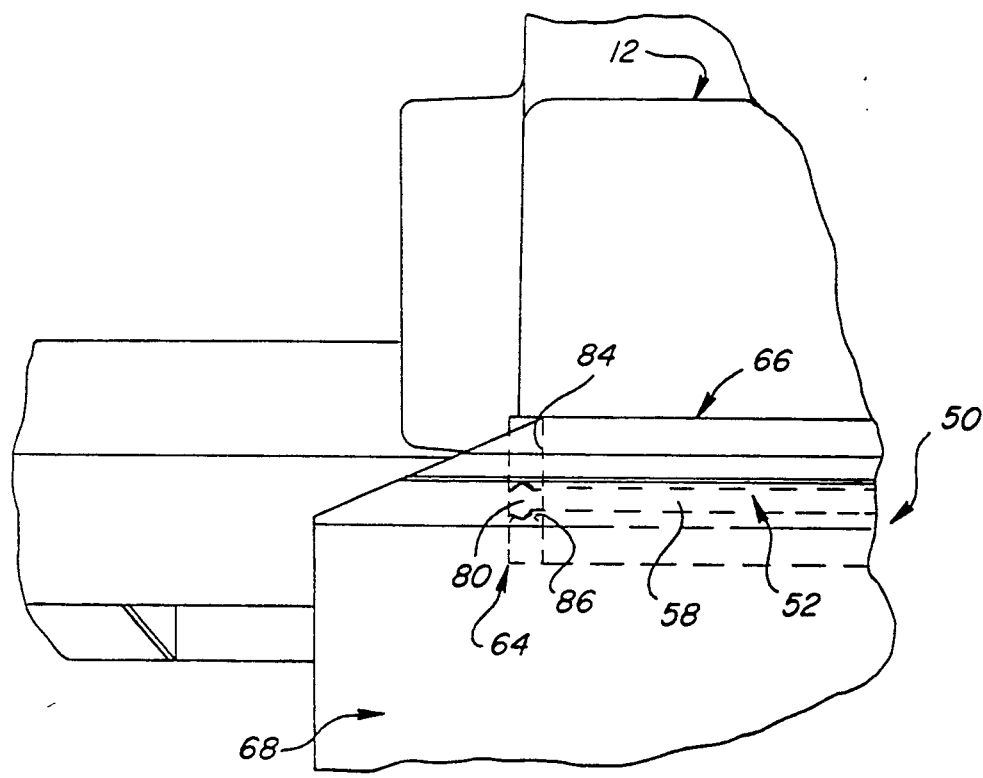
FIG. 4 is an enlarged view of FIG. 2, showing the open end of the flap mounting structure associated with the deck housing.
Figure 5:
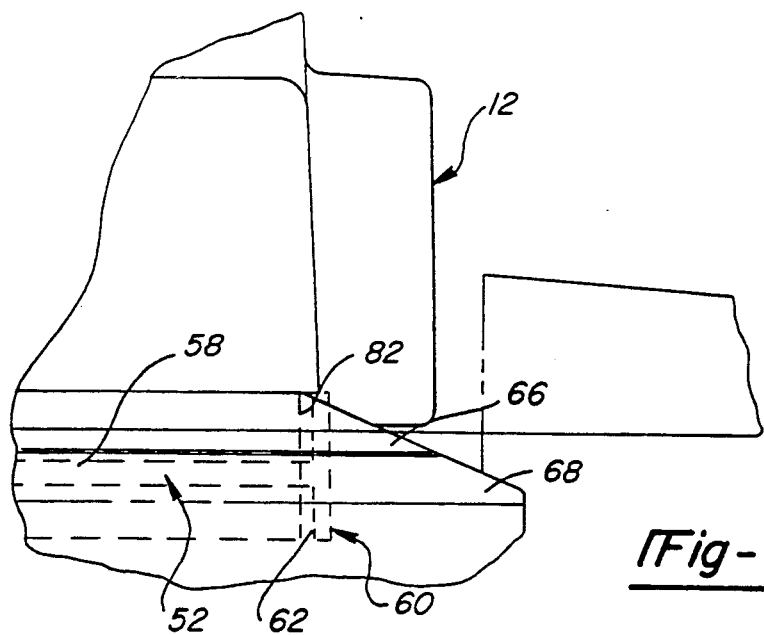
FIG. 5 is an enlarged view of FIG. 2, illustrating the closed end of the flap mounting structure associated with the deck housing.
Figure 6:
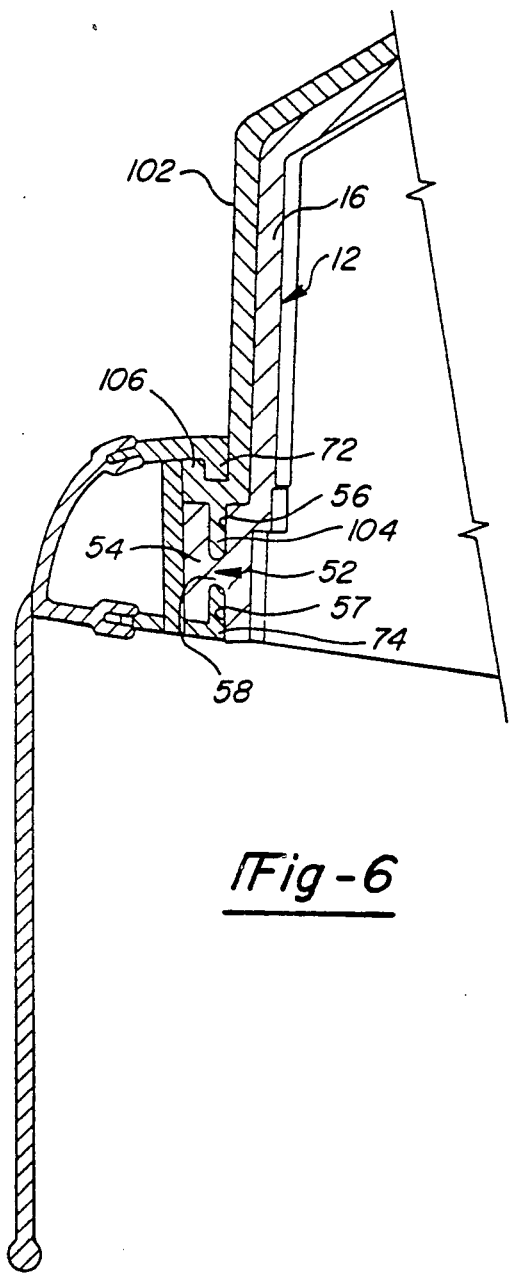
FIG. 6 illustrates a second embodiment of the present invention.

In reference to FIG. 6, a second embodiment of the present invention is illustrated in greater detail. Since the second embodiment functions substantially identical to the structure previously disclosed, similar reference numerals are used for similar structural components. In particular, an improved method and apparatus for securing a decorative shroud 102 to deck housing 12 is shown which permits the manufacturer to install different shroud configurations over a standardized deck housing. Therefore, the manufacturer has the ability to economically vary the aesthetics of the lawn and garden device without re-designing the entire deck housing 12. In particular, upper vertical slot 56 of "T"-shaped support member 52 is adapted to accept a downwardly extending elongated tab 104 of shroud 102. Shroud 102 also includes an upstanding tab member 106 which coacts with upper leg 72 and lower leg 74 within vertical slot 57 of "T"-shaped support member 52 so as to be surroundingly captured within "C"-shaped socket member 66 of flap assembly 50. The means hereinbefore detailed for inhibiting removal (barb 80 of FIG. 4) of shroud 102 from central stem 58 of "T"-shaped support member 52 is employed.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A lawn and garden device, comprising:
   a deck housing supported for longitudinal movement over the ground;
   a handle member having a first end secured to said deck housing and a second end forming grip means adapted to be grasped by an operator;
   said deck housing having support means on at least one of a front and rear outermost portion thereof, said support means having an open end and a closed end provided on opposite lateral sides of said deck housing;
   flap means for inhibiting entry of the operator's foot under said deck housing during operation of said lawn and garden device, said flap means having socket means for surroundingly capturing said support means so as to permit sliding longitudinal installation of said flap means onto said open end of said support means; and
   locking means for permitting sliding installation of said flap means onto said open end of said support means in a first direction while inhibiting sliding removal of said flap means in an opposite direction.

2. The lawn and garden device of claim 1 wherein said support means is a support member provided on said deck housing and located on a lower edge portion of at least one of said front and rear portions of said deck housing, said support member having an outermost vertically aligned section and a pair of inwardly facing slots defining a stem section connecting said outermost section to said deck housing.

3. The lawn and garden device of claim 2 wherein said support member is an elongated extension integrally formed on said deck housing.

4. The lawn and garden device of claim 2 wherein said socket means is configured to engage said inwardly facing slots for surroundingly capturing said outermost section of said support member upon inward sliding installation of said flap means onto said open end of said support member.

5. The lawn and garden device of claim 4 wherein said socket means forms an elongated "C"-shaped cavity.

6. The lawn and garden device of claim 4 wherein said socket means is fabricated from a relatively rigid material to inhibit unintended removal from said deck housing following installation onto said support member, and wherein said flap means further includes a relatively resilient lower shield portion secured to said socket means and which is adapted to extend downwardly toward the ground.

7. The lawn and garden device of claim 4 wherein said locking means is a ramped surface formed on said central stem section of said support member in close proximity to said open end thereof, said ramped surface terminating in a transverse surface extending vertically relative to said stem, said ramped surface adapted to permit sliding installation of said socket means thereover until a first distal edge of said socket means engages said closed end of said support member whereby a second distal end of said socket means snaps over said transverse surface so as to inhibit outward sliding removal of said flap means from said support member.

8. The lawn and garden device of claim 4 wherein said handle member is pivotally secured to said deck housing for pivotal movement thereon such that said deck housing includes said support members on each of said front and rear portions thereof.

9. A method for attaching a protective flap assembly to a deck housing of a lawn and garden device, said method comprising the steps of:
   providing a support member on at least one of a front and rear side of said deck housing, said support member having an open end and a closed end on opposite lateral sides of said deck housing;
   sliding a socket portion of a flap assembly onto said open end to surroundingly capture said support member;
   continuing sliding installation of said socket portion of said flap assembly until a first distal edge thereof engages the closed end of said support member;
   inhibiting removal of a second distal edge of said socket portion of said flap assembly from said open end of said support member following engagement of said first distal edge with said closed end.

10. The method of claim 9 wherein said sliding step includes inwardly slidingly inserting said socket portion of said flap assembly over said open end of said support member.

11. The method of claim 10 wherein said support member is configured to have a vertically extending outermost portion and a pair of inwardly facing slots defining a central horizontal stem for connecting said vertical portion to said deck housing, and wherein said socket portion of said flap assembly is configured to slide within said pair of inwardly facing slots and surroundingly capturing said vertical portion of said support member.

12. The method of claim 10 wherein said step of inhibiting removal of said flap assembly includes providing a ramped barblike member on said central stem near said open end of said support member such that upon inward sliding insertion said socket portion rides over said barb-like member until said first distal edge thereof engages said closed end of said support member whereby said second distal edge snaps behind said barblike member to inhibit outward sliding removal of said flap assembly from said support member.

13. A lawn and garden devce, comprising:
   a deck housing supported for longitudinal movement over the ground;

a handle member having a first end secured to said deck housing and a second end forming grip means adapted to be grasped by an operator;

said deck housing having a support member provided on a lower edge portion of at least one of a front and rear portion of said deck housing, said support member having an open end and a closed end provided on opposite lateral sides of said deck housing;

a protective flap assembly for inhibiting entry of the operator's foot under said deck housing during operation of said lawn and garden device, said protective flap assembly having an upper socket portion configured for surroundingly capturing said support member upon sliding longitudinal insertion of said upper socket portion over said open end of said support member;

a locking barb associated with said open end of said support member for permitting inward sliding insertion of said protective flap assembly onto said open end of said support member hwile inhibiting outward sliding removal of said protective flap assembly.

14. The law and garden device of claim 13 wherein said support member has a vertically aligned outermost section and a pair of inwardly facing slots defining a central stem section connecting said vertical section to said deck housing.

15. The lawn and garden device of claim 14 wherein said support member is an elongated extension integrally formed on said deck housing.

16. The lawn and garden device of claim 14 wherein said upper socket portion of said protective flap assembly is configured to slidingly engage said inwardly facing slots and surroundingly enclose said vertical section of said support member upon inward sliding insertion of said protective flap assembly onto said open end of said support member.

17. The lawn and garden device of claim 16 wherein said upper socket portion is fabricated from a relatively rigid material to inhibit unintended removal from said deck housing following sliding longitudinal installation onto said support member, and wherein said protective flap assembly further includes a relatively resilient lower shield portion secured to said upper socket portion and which is adapted to extend downwardly toward the ground.

18. The lawn and garden device of claim 17 wherein said locking barb has a ramped surface formed on said central stem section of said supporr member in close proximity to said open end thereof, said ramped surface terminating in a transverse surface displaced vertically relative to said stem, said ramped surface adapted to permit sliding installation of said upper socket portion over said ramped surface until a first distal edge of said upper socket portion engages said closed end of said support member whereby a second distal end of said socket portion snaps over said transverse surface so as to inhibit outward sliding removal of said socket portion from said support member.

19. The lawn and garden device of claim 1 further comprising a shroud connected to said deck support means and being operatively associated with said locking means, said shroud having an upstanding member, and wherein said flap means being operatively associated with said upstanding member.

* * * * *